US012051279B2

(12) United States Patent
Yoshida et al.

(10) Patent No.: US 12,051,279 B2
(45) Date of Patent: Jul. 30, 2024

(54) LANE PRICING SYSTEM, LANE PRICING DEVICE, METHOD, AND PROGRAM

(71) Applicant: NIPPON TELEGRAPH AND TELEPHONE CORPORATION, Tokyo (JP)

(72) Inventors: Manabu Yoshida, Musashino (JP); Yuki Yokohata, Musashino (JP); Kouhei Mori, Musashino (JP); Takahiro Hata, Musashino (JP); Atsuhiko Maeda, Musashino (JP); Ippei Shake, Musashino (JP); Satoshi Fukada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 320 days.

(21) Appl. No.: 17/267,613

(22) PCT Filed: Aug. 7, 2019

(86) PCT No.: PCT/JP2019/031201
§ 371 (c)(1),
(2) Date: Feb. 10, 2021

(87) PCT Pub. No.: WO2020/039938
PCT Pub. Date: Feb. 27, 2020

(65) Prior Publication Data

US 2021/0312720 A1 Oct. 7, 2021

(30) Foreign Application Priority Data

Aug. 24, 2018 (JP) ................................ 2018-157301

(51) Int. Cl.
*G07B 15/06* (2011.01)
*G06Q 30/0283* (2023.01)
(Continued)

(52) U.S. Cl.
CPC ......... *G07B 15/06* (2013.01); *G06Q 30/0284* (2013.01); *G06T 7/70* (2017.01); *G06V 20/588* (2022.01); *G06T 2207/30256* (2013.01)

(58) Field of Classification Search
None
See application file for complete search history.

(56) References Cited

U.S. PATENT DOCUMENTS 9,595,139 B1 3/2017 Breed et al.
2008/0258936 A1 10/2008 Chitor et al.
(Continued)

FOREIGN PATENT DOCUMENTS

CN 104504902 A 4/2015
EP 1674826 A1 6/2006
(Continued)

OTHER PUBLICATIONS

Jie Du, Next Generation Automated Vehicle Location Systems: Positioning at the Lane Level, Mar. 2008, IEEE (Year: 2008).*
(Continued)

*Primary Examiner* — Resha Desai
*Assistant Examiner* — Ismail A Manejwala
(74) *Attorney, Agent, or Firm* — Harness, Dickey & Pierce, P.L.C.

(57) ABSTRACT

A lane pricing technique for charging a mobile body traveling on a road for use of a lane is provided. A lane pricing device according to one embodiment is configured to: acquire from a mobile body traveling on a road, at least one of position information of a mobile body measured based on a positioning signal, and/or a camera image that is acquired by capturing an image from the mobile body and includes a part of a lane in which the mobile body is moving; specify, based on at least one of the position information and/or the camera image, a lane in which the mobile body is moving;
(Continued)

| Time | Latitude | Longitude |
|---|---|---|
| 2018/1/1 10:00:00 | ... | ... |
| 2018/1/1 10:00:01 | ... | ... |
| 2018/1/1 10:00:02 | ... | ... |
| 2018/1/1 10:00:03 | ... | ... |
| 2018/1/1 10:00:04 | ... | ... |
| ... | ... | ... |

acquire lane identification information for identifying a specified lane along with time information indicative of time when the mobile body is moving; and determine and output a toll to be charged to the mobile body in units of lanes based on the lane identification information and the time information.

6 Claims, 10 Drawing Sheets

(51) Int. Cl.

| | |
|---|---|
| ***G06T 7/70*** | (2017.01) |
| ***G06V 20/56*** | (2022.01) |

(56) References Cited

U.S. PATENT DOCUMENTS

| | | | | |
|---|---|---|---|---|
| 2009/0295599 A1* | 12/2009 | Coffee | G07B 15/063 | 340/928 |
| 2012/0215594 A1* | 8/2012 | Gravelle | G07B 15/063 | 705/13 |
| 2014/0002652 A1* | 1/2014 | Gonzales | H04N 7/18 | 348/148 |
| 2018/0043935 A1* | 2/2018 | Hashimoto | G08G 1/20 | |
| 2018/0253975 A1* | 9/2018 | Mizutani | G08G 1/167 | |
| 2019/0122447 A1* | 4/2019 | Shah | G06Q 20/0855 | |

FOREIGN PATENT DOCUMENTS

| | | | |
|---|---|---|---|
| JP | 2011170628 | A | 9/2011 |
| JP | 2016057801 | A | 4/2016 |
| JP | 2018072011 | A | 5/2018 |
| JP | 2018073233 | A | 5/2018 |

OTHER PUBLICATIONS

Katsutoshi Ota, "Significance and Applicability of Road Pricing", Journal of International Association of Traffic and Safety Sciences, vol. 15, No. 4, Dec. 1989, Internet <URL: http: //www.iatss.or.jp/common/pdf/publication/iatss-review/15-4-02.pdf>.

International Search Report issued in PCT/JP2019/031201, mailed Sep. 10, 2019.

* cited by examiner

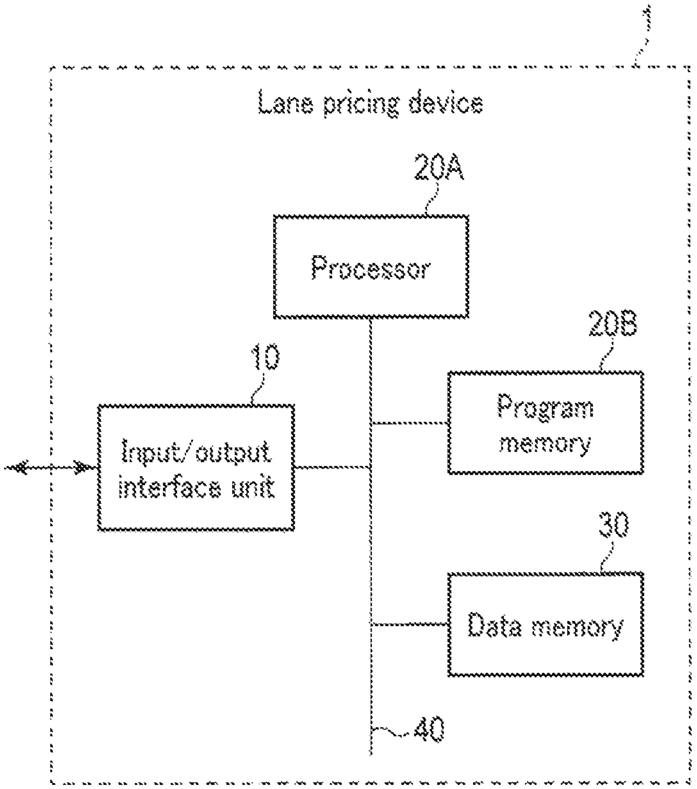
F I G. 2

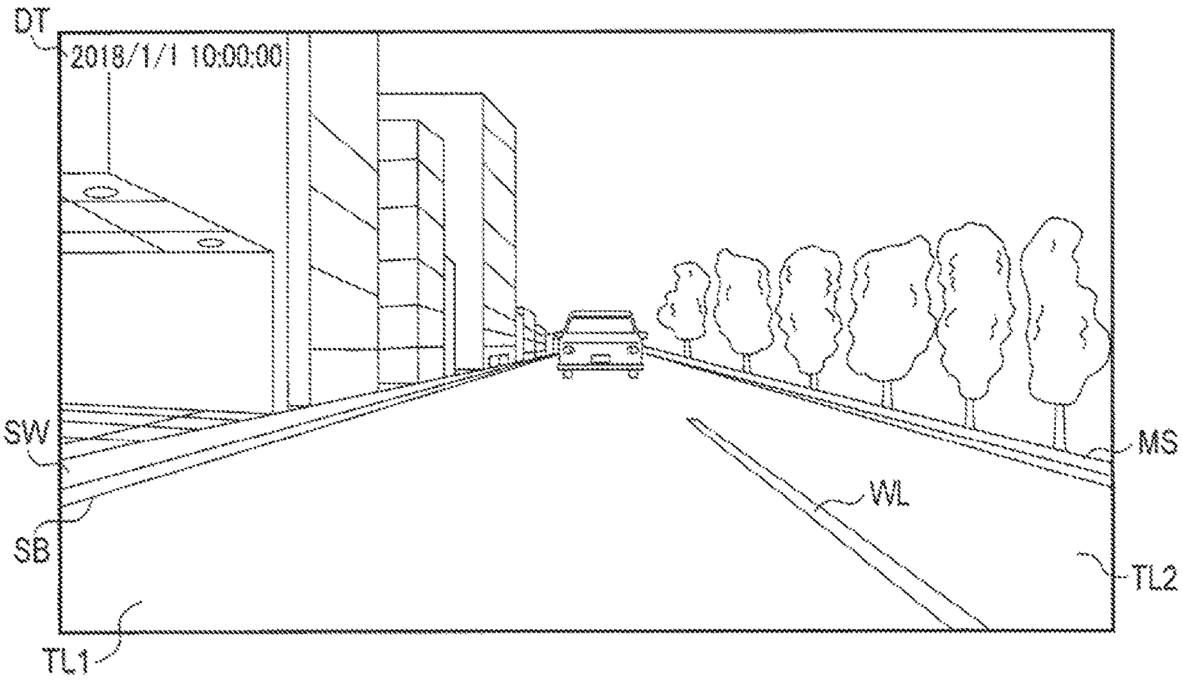
F I G. 6A
| Time | Latitude | Longitude |
| --- | --- | --- |
| 2018/1/1 10:00:00 | ... | ... |
| 2018/1/1 10:00:01 | ... | ... |
| 2018/1/1 10:00:02 | ... | ... |
| 2018/1/1 10:00:03 | ... | ... |
| 2018/1/1 10:00:04 | ... | ... |
| ... | ... | ... |
F I G. 6B

| Road ID | Road start point | Road end point | Lane ID | Lane start point | Lane end point |
|---|---|---|---|---|---|
| A | (Latitude, Longitude) | (Latitude, Longitude) | A-1 | (Latitude, Longitude) | (Latitude, Longitude) |
| A | Ditto | Ditto | A-2 | (Latitude, Longitude) | (Latitude, Longitude) |
| B | (Latitude, Longitude) | (Latitude, Longitude) | B-1 | (Latitude, Longitude) | (Latitude, Longitude) |
| B | Ditto | Ditto | B-2 | (Latitude, Longitude) | (Latitude, Longitude) |
| B | Ditto | Ditto | B-3 | (Latitude, Longitude) | (Latitude, Longitude) |
| . . . | . . . | . . . | . . . | . . . | . . . |

FIG. 7

| Vehicle ID | Date and time | Lane ID |
|---|---|---|
| V1 | 2018/1/1 10:00:00 | A-1 |
| V1 | 2018/1/1 10:00:01 | A-1 |
| V1 | 2018/1/1 10:00:02 | A-1 |
| V1 | 2018/1/1 10:00:03 | A-1 |
| V1 | 2018/1/1 10:00:04 | A-1 |
| . . . | . . . | . . . |
| V2 | 2018/1/1 11:00:10 | B-3 |
| V2 | 2018/1/1 11:00:11 | B-3 |
| V2 | 2018/1/1 11:00:12 | B-3 |
| V2 | 2018/1/1 11:00:13 | B-3 |
| V2 | 2018/1/1 11:00:14 | B-3 |
| . . . | . . . | . . . |

FIG. 8

| Road ID | Lane ID | Time zone | Toll (yen) |
| --- | --- | --- | --- |
| A | A-1 | 10:00~11:00 | 10 |
| A | A-1 | 11:00~12:00 | 20 |
| A | A-1 | 12:00~13:00 | 50 |
| A | A-1 | 13:00~14:00 | 20 |
| A | A-1 | 14:00~15:00 | 10 |
| . . . | . . . | . . . | . . . |
| A | A-2 | 10:00~11:00 | 30 |
| A | A-2 | 11:00~12:00 | 60 |
| A | A-2 | 12:00~13:00 | 150 |
| A | A-2 | 13:00~14:00 | 60 |
| A | A-2 | 14:00~15:00 | 30 |
| . . . | . . . | . . . | . . . |

FIG. 9

| Vehicle ID | Date and time | Lane ID |
|---|---|---|
| V1 | 10:00~11:00 | A-1 |
| V1 | 10:00~11:00 | A-1 |
| V1 | 10:00~11:00 | A-1 |
| V2 | 10:00~11:00 | A-1 |
| V2 | 10:00~11:00 | A-1 |

FIG. 10A

| Vehicle ID | Number of records | Lane ID |
|---|---|---|
| V1 | 3 | A-1 |
| V2 | 2 | A-1 |
| Average | 2.5 | A-1 |

FIG. 10B

LANE PRICING SYSTEM, LANE PRICING DEVICE, METHOD, AND PROGRAM

CROSS-REFERENCE TO RELATED APPLICATIONS

This is a U.S. national phase application under 35 USC 371 of international application PCT/JP2019/031201, filed on Aug. 7, 2019, which claims priority to Japanese patent application No. 2018-157301, filed on Aug. 24, 2018. The entire disclosures of the above applications are incorporated herein by reference.

FIELD

One aspect of the present invention relates to a lane pricing system, a lane pricing device, a method, and a program that charge a toll for each lane to a mobile body such as a vehicle traveling on a road.

BACKGROUND

Conventionally, road pricing that levies tolls on automobiles, etc. for use of a road has been known. Road pricing is for changing a toll amount to an automobile user for each time zone, for example, in a specific area or road, thereby promoting a change in traffic behavior to suppress or optimize automobile traffic volume. For the road pricing described above, the significance and applicability have been reported in terms of charging tolls on vehicles for entry into a designated area for the purpose of vehicle congestion and environmental protection in the designated area (for example, see Non-Patent Document 1).

Entry of vehicles into a chargeable area can be determined by, for example, an electronic toll collection system (ETC). Even in the absence of a device such as an ETC, for example, there are alternate methods such as a method in which entry of a vehicle is detected from a video obtained with a fixed camera installed on a roadside, and charging is performed using information on a number plate of the vehicle, or a method in which whether the vehicle has entered a chargeable area is determined using GPS information of the vehicle received by a roadside wireless device, and then charging is requested.

CITATION LIST

Non Patent Literature

Katsutoshi OTA, "Significance and Applicability of Road Pricing", Journal of International Association of Traffic and Safety Sciences, Vol. 15, No. 4, December in 1989, Internet <URL: http://www.iatss.or.jp/common/pdf/publication/iatss-review/15-4-02.pdf>

SUMMARY

Technical Problem

In the technique described in Non-Patent Document 1, a chargeable area as a chargeable object is set to an area or road. However, for further optimization of the traffic volume, a charging design in units of lanes used for traveling, not in units of roads, may be effective. However, the determination of entry into a chargeable area in units of lanes results in enormous costs because the determination as to whether an automobile has entered into a chargeable lane requires a sensor to be embedded on the infrastructure side, for example, by installing a highly accurate fixed camera or a roadside device that receives GPS information of automobiles. In addition, there are problems in which some areas cannot stably receive GPS signals due to the influence of an obstacle or the like, or current GPS information contains a measurement error. Thus, the accurate determination as to whether or not a vehicle has entered a chargeable area was difficult to make in some cases.

The present invention has been made in view of the above circumstances, and an object of the present invention is to provide a technique that enables a mobile body traveling on a road to be charged in units of lanes without the need to provide an additional sensor on the road itself.

Solution to Problem

In order to solve the above problems, according to a first aspect of the present invention, a lane pricing system includes: a vehicle-mounted device mounted on a mobile body configured to move on a road; and a lane pricing device that is capable of communicating with the vehicle-mounted device and is configured to determine a toll to be charged to the mobile body for use of a lane constituting the road, in which the vehicle-mounted device includes at least one of a position information acquisition unit configured to acquire position information of the mobile body measured based on a positioning signal transmitted from a transmission source, and/or an image acquisition unit configured to acquire a camera image that is acquired by capturing an image from the mobile body and includes a part of a lane in which the mobile body is moving, and in which the lane pricing device includes: an observation data acquisition unit configured to acquire at least one of the position information and/or the camera image from the vehicle-mounted device; a movement information acquisition unit configured to specify, based on at least one of the position information and/or the camera image, a lane in which the mobile body is moving, and acquire lane identification information for identifying a specified lane along with time information indicative of a time when the mobile body moves in the lane; a toll determination unit configured to determine a toll to be charged to the mobile body based on the lane identification information and the time information; and an output unit configured to output the determined toll.

According to a second aspect of the present invention, a lane pricing device configured to determine a toll to be charged to a mobile body for use of a lane constituting a road includes: an observation data acquisition unit configured to acquire at least one of position information of the mobile body measured based on a positioning signal transmitted from a transmission source, and/or a camera image that is acquired by capturing an image from the mobile body and including a part of a lane in which the mobile body is moving; a movement information acquisition unit configured to specify, based on at least one of the position information and/or the camera image, a lane in which the mobile body is moving, and acquire lane identification information for identifying a specified lane along with time information indicative of time when the mobile body moves in the lane; a toll determination unit configured to determine a toll to be charged to the mobile body based on the lane identification information and the time information; and an output unit configured to output the determined toll.

According to a third aspect of the present invention, the lane pricing device according to the second aspect further includes: a movement information acquisition unit configured to collect the lane identification information and the time information acquired from a plurality of mobile bodies along with identification information of each of the mobile bodies; a traffic flow evaluation unit configured to evaluate a traffic flow based on identification information, lane identification information, and time information that are acquired from each of the mobile bodes; and a dynamic toll control unit configured to dynamically control a toll to be charged to each of the mobile bodies determined by the toll determination unit in accordance with an evaluation result of the traffic flow.

According to a fourth aspect of the present invention, in the lane pricing device according to the third aspect, the traffic flow evaluation unit relatively evaluates a traffic flow for each lane, and the dynamic toll control unit dynamically controls a toll to be charged to each of the mobile bodies in accordance with a relative evaluation result of a traffic flow.

According to a fifth aspect of the present invention, in the lane pricing device according to the second aspect, the movement information acquisition unit includes: a chargeable area information acquisition unit configured to acquire latitude and longitude information of a geographical area including a lane as a chargeable object; a chargeable area determination unit configured to determine whether or not the mobile body is moving within the geographical area based on at least one of the position information of the mobile body and/or the camera image, and latitude and longitude information of the geographical area; and a lane specification unit configured to, if the chargeable area determination unit determines that the mobile body is moving within the geographical area, specify a lane in which the mobile body is moving.

According to a sixth aspect of the present invention, in the lane pricing device according to the second aspect, the movement information acquisition unit specifies a lane in which the mobile body is moving, by utilizing both the position information of the mobile body and the camera image.

Advantageous Effects of Invention

According to the first and second aspects of the present invention, a lane in which a mobile body is moving is specified based on at least one of position information from a positioning signal of the mobile body moving on a road and/or a camera image captured by the mobile body, and identification information of the lane is acquired along with time information. Then, based on the identification information of the lane and the time information, a toll to be charged to the mobile body for use in units of lanes is determined and output.

This enables a mobile body traveling on a road to be charged in units of lanes using data acquired by a general sensor included in the mobile body without the need to provide an additional sensor on the road itself. Since a toll can be set in units of lanes, not in units of roads, charging can be performed in accordance with detailed conditions. In addition, since the time information is also acquired along with the identification information of a lane, it is possible to perform charging with various settings in consideration of time elements such as a time zone in which a vehicle enters a target area and a time required for the vehicle to pass through the target area. Since the determination of whether or not a mobile body is passing through a lane as a chargeable object does not depend on a sensor on an infrastructure side, even when a chargeable area or lane is set or changed, or a detailed toll setting is made in accordance with a day of the week, a time zone, an attribute of the mobile body, etc., such setting or changing can be realized at a minimum cost without requiring processing with respect to a sensor on the infrastructure side.

According to the third aspect of the present invention, identification information of a lane in which a mobile body is moving and time information are collected from a plurality of mobile bodies, a traffic flow is evaluated based on the collected information, and a toll to be charged to each mobile body is dynamically controlled according to the evaluation result. In this way, a traffic flow in a target area can be indirectly adjusted by dynamically controlling a toll for each lane. This is useful for controlling a traffic flow in units of lanes for the purpose of preferential traveling of an emergency vehicle, designation of a recommended lane in consideration of a surrounding environment and a road surface state, and the like.

According to the fourth aspect of the invention, a traffic flow in units of lanes is relatively evaluated and a toll is dynamically controlled in accordance with the relative evaluation. This allows a traffic flow to be indirectly and relatively controlled in units of lanes, so that smooth traffic can be promoted in consideration of the balance between lanes.

According to the fifth aspect of the present invention, based on latitude and longitude information of a geographical area including a lane as a chargeable object, and at least one of position information of the mobile body and/or camera image information, whether or not a mobile body is moving in the geographical area is determined first. When it is determined that the mobile body is moving in the geographical area, a lane in which the mobile body is moving is then specified. Accordingly, a position of the mobile body is determined based on the area level and is then determined more accurately based on the lane level. This can reduce the data processing load on the device.

According to the sixth aspect of the present invention, a lane in which a mobile body is moving is identified using both position information from a positioning signal and a camera image. This allows a lane in which a mobile body is moving to be identified with higher accuracy. In addition, even in a case where the accuracy of a positioning signal decreases as a mobile body moves, the lane identification accuracy can be appropriately maintained by combining the position information and the camera image.

That is, according to each aspect of the present invention, it is possible to provide a technique by which a mobile body traveling on a road can be charged in units of lanes without the need to provide an additional sensor on the road itself.

BRIEF DESCRIPTION OF THE DRAWINGS

FIG. 2 is a block diagram showing a hardware configuration of the lane pricing device according to the embodiment of the present invention.

FIG. 6A is a view showing camera image data as an example of observation data acquired from a vehicle-mounted device.

FIG. 6B is a view showing position information data as an example of observation data acquired from the vehicle-mounted device.

FIG. 7 is a diagram showing an example of chargeable area data stored in a chargeable area information memory.

FIG. 8 is a view showing an example of movement information data stored in a movement information memory.

FIG. 9 is a view showing an example of toll information data stored in a toll information memory.

FIG. 10A is a view showing an example of datasets divided for each lane ID.

FIG. 10B is a view showing an example of datasets divided for each lane ID and integrated for each car ID.

DETAILED DESCRIPTION

Embodiments of the present invention will be described below with reference to the drawings.

EMBODIMENT (Configuration)

(I) Lane Pricing System

Figure 1:
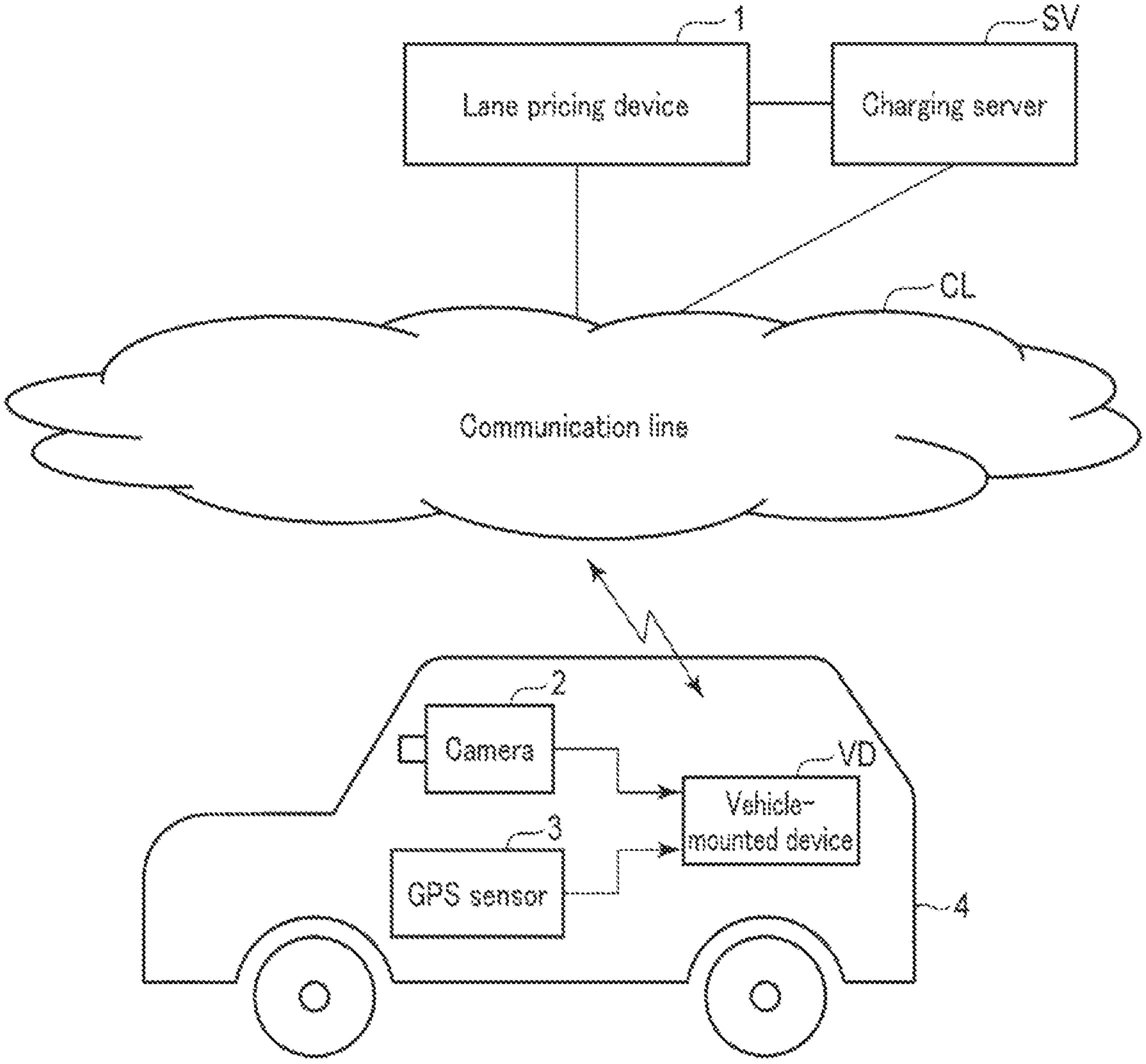
FIG. 1 is a view showing a schematic configuration of a lane pricing system including a lane pricing device according to an embodiment of the present invention.

FIG. 1 shows an example of a usage environment of a lane pricing system according to an embodiment of the present invention.

The lane pricing system according to this embodiment levies a toll on a mobile body for passage (usage) through a lane as a chargeable object, and includes a vehicle-mounted device VD mounted on the mobile body, a charging server SV, and a lane pricing device 1 according to an embodiment of the present invention. The vehicle-mounted device VD, the charging server SV, and the lane pricing device 1 are mutually communicable via a communication line CL.

FIG. 1 shows an automobile as an example of a mobile body 4. The mobile body 4 may further include a camera 2 and a GPS sensor 3.

As the camera 2, for example, a solid-state imaging device such as a CCD (Charge Coupled Device), a CMOS (Complementary Metal Oxide Semiconductor) sensor, etc., is adopted. The camera 2 is set in terms of its installation location, orientation, and angle in such a manner that an imaging range includes a road region in a given direction such as a traveling direction of the mobile body 4. The camera 2 acquires camera image data and outputs the acquired data to the vehicle-mounted device VD.

The camera 2 may be provided exclusively for lane pricing; however, any camera such as a camera of a drive recorder or a camera mounted on a vehicle for another purpose is usable, provided that such a camera can obtain equivalent image data. For example, when the mobile body is a two-wheel vehicle or a bicycle, a camera provided on a helmet of a driver may be used, or a camera provided on a mobile terminal such as a smartphone or a tablet terminal carried by a fellow passenger in the mobile body 4 may be used. As a camera type, an infrared camera may be used. Furthermore, camera image data acquired by a camera may be moving image data or still image data captured at certain time intervals.

The GPS sensor 3 receives GPS signals transmitted by a plurality of GPS satellites and performs range-finding operation, thereby calculating the latitude and longitude of the mobile body 4. The GPS sensor 3 outputs GPS measurement data including the aforementioned calculated latitude and longitude to the vehicle-mounted device VD. In addition to the latitude and longitude (hereinafter, also referred to as "position information"), the GPS measurement data may include information indicating reliability of the GPS measurement. The reliability of the GPS measurement is determined, for example, in accordance with the arrangement state of the GPS satellites. The acquisition of position information is not limited to the method using signals from GPS satellites, and may adopt another method such as using position information of a wireless base station or a WiFi access point, provided that equivalent functions are exerted.

The vehicle-mounted device VD is, for example, a wireless device attached to a dashboard of an automobile, and is configured to receive various types of data from the camera 2 and the GPS sensor 3, and to transmit the received data along with date and time information or identification information of the vehicle-mounted device VD (or an ETC card etc., that is inserted into the vehicle-mounted device VD) to the lane pricing device 1 or a charging server SV via a communication line CL.

The charging server SV is, for example, a server device provided in a traffic control center, and is configured to perform charging processing of levying a toll on the mobile body 4 for passage through a lane as a chargeable object. The charging processing may be performed by a discretionary system. For example, the charging process may be performed on a holder of an ETC card by acquiring information of the ETC card inserted into the vehicle-mounted device VD, or may be performed on an owner of the mobile body 4 through car identification information such as a number plate or an IC chip mounted on the mobile body 4.

The lane pricing device 1 performs processing of determining a toll to be charged to the mobile body 4 for use of a lane. For example, as shown in FIG. 1, the lane pricing device 1 is implemented as a server device capable of transmitting and receiving data to and from the vehicle-mounted device VD via the communication line CL. However, the lane pricing device 1 is not limited to the above, and may be implemented as a part of the charging server SV or may be implemented as a part of the vehicle-mounted device VD.

The lane pricing device 1 according to the embodiment shown in FIG. 1 is configured to: receive camera image data and GPS measurement data from the vehicle-mounted device VD via the communication line CL; determine whether or not the mobile body 4 has entered a lane as a chargeable object, for example, at certain time intervals; and when it is determined that the mobile body 4 has entered the lane as a chargeable object, determine and output a toll to be charged to the mobile body 4. The lane pricing device 1 is also configured to: transmit a value of a determined toll to the vehicle-mounted device VD in order to, for example, notify a driver of the mobile body 4; display the value on a road information display device (not shown) under the control of the traffic control center; and transmit the value to the charging server SV in order to request charging processing.

An automobile described as an example of the mobile body 4 is not limited to a specific automobile, and may be an automobile of various individuals, vehicle types, or manufacturers. The mobile body 4 may include all mobile bodies that may be charged for use of a road, such as a car, a two-wheeled vehicle, a bicycle, a personal mobility vehicle, and a vehicle towed by livestock, such as a carriage. Furthermore, the mobile body 4 is not limited to a vehicle, and may be a pedestrian. Therefore, the vehicle-mounted device VD shown in FIG. 1 is merely an example, and may be replaced with a smartphone or the like carried by a pedestrian.

(II) Lane Pricing Device (I) Hardware Configuration

FIG. 2 is a block diagram showing a hardware configuration of the lane pricing device 1 according to an embodiment of the present invention. The lane pricing device 1 is constituted of, for example, a server computer or a personal computer, and includes, as hardware, an input/output interface unit 10, a hardware processor 20A such as a central processing unit (CPU), a program memory 20B, and a data memory 30, which are connected to each other via a bus 40.

The input/output interface unit 10 includes, for example, one or more wired or wireless communication interface units. The input/output interface unit 10 receives information from the vehicle-mounted device VD via the communication line CL, and outputs information generated by the lane pricing device 1 to the outside.

The program memory 20B serves as a storage medium, and may be a combination of a nonvolatile memory such as a hard disk drive (HDD) or a solid state drive (SSD), which allows writing and reading at any time, and a nonvolatile memory such as a read only memory (ROM). Programs necessary for executing various types of control processing are stored in the program memory 20B.

The data memory 30 serves as a storage medium, and may be a combination of a nonvolatile memory such as an HDD or SSD, which allows writing and reading at any time, and a volatile memory such as a random access memory (RAM). The data memory 30 is used to store data acquired and created in various types of processing.

(ii) Software Configuration

Figure 3:
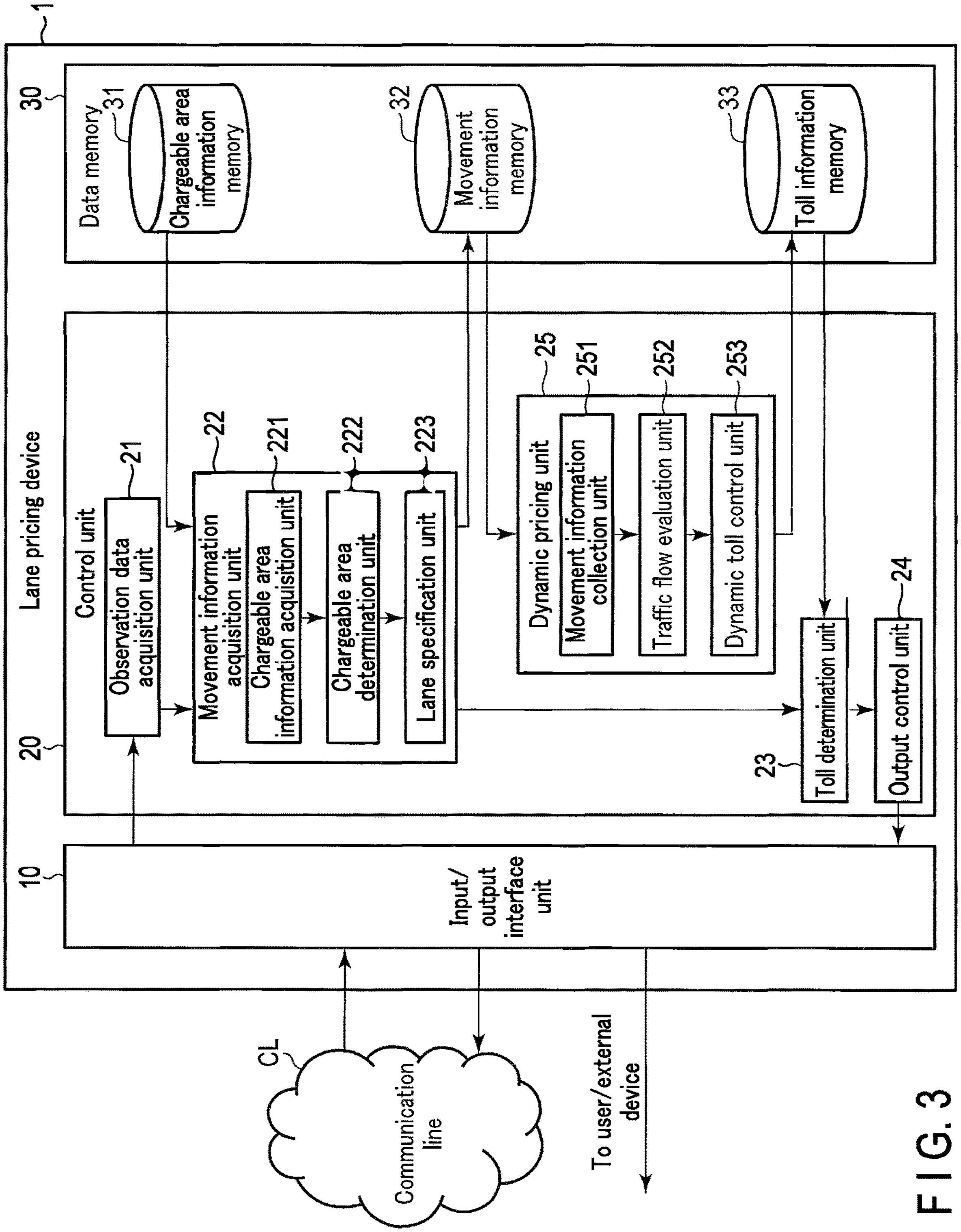
FIG. 3 is a block diagram showing a software configuration of the lane pricing device according to the embodiment of the present invention.

FIG. 3 is a block diagram showing a software configuration of the lane pricing device 1 according to the embodiment of the present invention, associated with the hardware configuration shown in FIG. 2.

The input/output interface unit 10 receives, from the vehicle-mounted device VD via the communication line CL, various types of data output from the camera 2 and the GPS sensor 3, for example, a vehicle-mounted camera video recorded by a drive recorder mounted on the mobile body 4 and position information from a GPS sensor mounted on the mobile body 4, and outputs the received data to a control unit 20. Furthermore, the input/output interface unit 10 outputs data output from the control unit 20 to the outside. For example, the input/output interface unit 10 is configured to transmit, as an output result, a determined toll value to the charging server SV or the vehicle-mounted device VD of the mobile body 4. The input/output interface unit 10 is also configured to output data to an output device (not shown).

A storage area of the data memory 30 includes a chargeable area information memory 31, a movement information memory 32, and a toll information memory 33.

The chargeable area information memory 31 is used to store chargeable area data including latitude and longitude information on a geographic area as a chargeable object. The latitude and longitude information on a geographical area as a chargeable object includes latitude and longitude information on a lane as a chargeable object.

The movement information memory 32 is used to store, for the mobile body 4 moving within the geographical area as a chargeable area, movement information data including identification information of the mobile body 4, information for identifying a position of the mobile body 4, in particular, a lane in which the mobile body 4 is moving, and time information on a time when the mobile body 4 is moving.

The toll information memory 33 is used for storing toll information data including preset toll information of a toll that is charged to the mobile body 4 passing through a lane as a chargeable object. The toll information may be input by a road manager or the like at any time, or may be automatically corrected or changed according to a preset standard.

The memories 31 to 33 are not essential components, and may be provided in an external storage device such as a database server arranged in the cloud, for example. In this case, the lane pricing device 1 acquires necessary data by accessing a database server of the cloud via the communication line CL or the like.

The control unit 20 is constituted of the hardware processor 20A and the program memory 20B, and includes, as software-based processing function units, an observation data acquisition unit 21, a movement information acquisition unit 22, a toll determination unit 23, an output control unit 24, and a dynamic pricing unit 25. All of the processing functions of these units are realized by causing the above hardware processor 20A to execute programs stored in the program memory 20B. These processing functions may be realized by using programs provided through a network, not by using the programs stored in the program memory 20B.

The observation data acquisition unit 21 acquires camera image data output from the camera 2 and GPS measurement data output from the GPS sensor 3 via the input/output interface unit 10, and outputs them to the movement information acquisition unit 22. Hereinafter, the camera image data and the GPS measurement data are also collectively referred to as "observation data". The camera image data and the GPS measurement data may be associated with each other according to date and time information.

The movement information acquisition unit 22 performs processing of: specifying a lane in which the mobile body 4 is moving, based on at least one of the camera image data and/or the GPS measurement data; and acquiring lane identification information for identifying the specified lane along with time information. The movement information acquisition unit 22 includes a chargeable area information acquisition unit 221, a chargeable area determination unit 222, and a lane specification unit 223.

The chargeable area information acquisition unit 221 reads chargeable area data stored in the chargeable area information memory 31 and outputs it to the chargeable area determination unit 222.

The chargeable area determination unit 222 determines whether or not a travel position of the mobile body 4 is within the chargeable area, based on the chargeable area data received from the chargeable area information acquisition unit 221 and the camera image data and GPS measurement data received from the observation data acquisition unit 21.

When it is determined that the mobile body 4 is traveling within the chargeable area, the lane specification unit 223 performs processing of: specifying a lane in which the mobile body 4 is traveling; and acquiring identification information (ID) of the specified lane.

The movement information acquisition unit 22 stores the ID of the lane in which the mobile body 4 is traveling, which is specified by the lane specification unit 223, in the movement information memory 32, and outputs the ID to the toll determination unit 23.

The toll determination unit 23 reads toll information data stored in the toll information memory 33, retrieves and extracts corresponding data based on the ID of the lane received from the movement information acquisition unit 22, determines a value of the toll to be charged to the mobile body 4, and outputs the value to the output control unit 24.

The output control unit 24 acquires the value of the toll to be charged, which is determined by the toll determination unit 23, and outputs the value to the outside via the input/output interface unit 10. For example, the output control unit 24 may transmit the determined value of the toll to the charging server SV in order to request charging processing, may transmit the determined value of the toll to the vehicle-mounted device VD in order to notify a driver of the mobile body 4 of an estimated toll amount, or may output the determined value of the toll to the control unit of the traffic control center in order to display the determined value on a display device such as an electric bulletin board on a road.

The dynamic pricing unit 25 performs processing of: acquiring lane identification information and time information from a plurality of mobile bodies together with identification information of each mobile body; evaluating a traffic flow based on the acquired identification information of each mobile body, lane identification information, and time information; and dynamically controlling a toll to be charged to each mobile body according to an evaluation result of the traffic flow, and includes a movement information collection unit 251, a traffic flow evaluation unit 252, and a dynamic toll control unit 253.

The movement information collection unit 251 performs processing of: reading movement information data that is stored in the movement information memory 32 and includes identification information of each mobile body 4, an ID of a lane currently used for traveling, and time information; and outputting the read movement information data to the traffic flow evaluation unit 252.

The traffic flow evaluation unit 252 performs processing of calculating an index representing a traffic flow in each lane based on the received movement information data.

The dynamic toll control unit 253 performs processing of recalculating a toll of a target lane in accordance with the calculated index representing the traffic flow, and updating the toll information data stored in the toll information memory 33.

(Operation)

Figure 4:
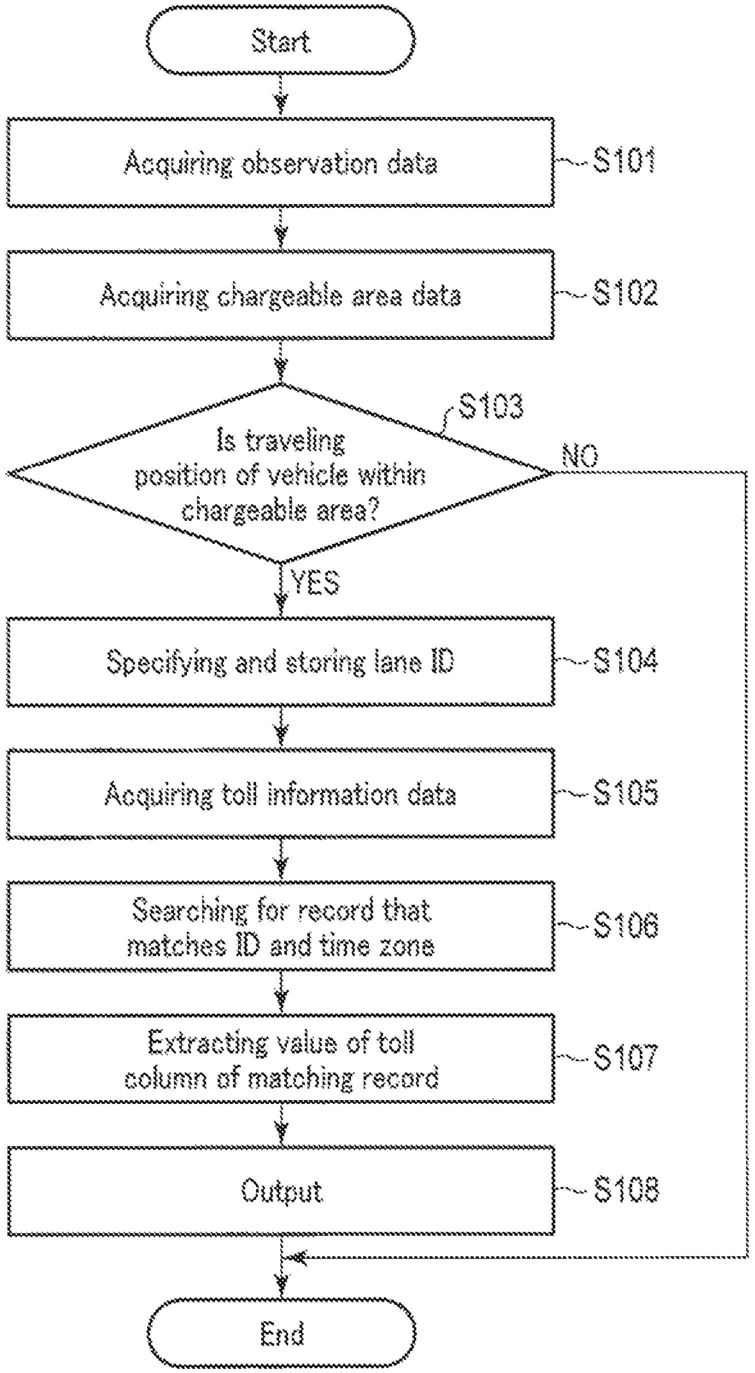
FIG. 4 is a flowchart showing a processing procedure and processing contents of toll determination processing by the lane pricing device shown in FIG. 3.

Next, an information processing operation by the lane pricing device 1 configured as described above will be described. FIG. 4 is a flowchart showing a processing procedure and processing contents of toll determination processing by the lane pricing device 1.

(1) Acquisition of Observation Data

First, in step S101, the control unit 20 of the lane pricing device 1 acquires camera image data and GPS measurement data as observation data via the input/output interface unit 10 under the control of the observation data acquisition unit 21. Herein, it is assumed that a video of a front side, which is captured by the vehicle-mounted camera 2 of the mobile body 4 while it is traveling, is acquired as camera image data. The camera image data and the GPS measurement data are measured at time intervals of at least about 1 second and are synchronized in time with a granularity of about 1 second.

FIG. 6A shows an example of camera image data acquired by the observation data acquisition unit 21. In the camera image shown in FIG. 6A, in addition to surrounding buildings and a traveling vehicle ahead, lanes TL1 and TL2 (also collectively referred to as "lane TL"), a division line (white line) WL that divides the lane TL, a median strip MS, a sidewalk SW, a curb SB that separates a roadway from the sidewalk SW, and the like are captured with respect to a road on which the mobile body 4 is traveling. The camera image data may also include date and time information DT about a time when an image is captured.

FIG. 6B shows an example of GPS measurement data acquired by the observation data acquisition unit 21. The GPS measurement data may include information on a time when the GPS measurement is performed and information on a measured position (latitude and longitude). In FIG. 6B, numerical values are omitted in the latitude and longitude columns; however, in reality, GPS measurement data containing specific numerical values is acquired.

(2) Determination of Chargeable Area and Specifying of Lane Currently Used for Traveling Next, the control unit 20 of the lane pricing device 1, under the control of the movement information acquisition unit 22, determines whether or not a lane in which the mobile body 4 is traveling corresponds to a chargeable area, and if so, further performs processing of specifying the lane in which the mobile body 4 is traveling.

First, in step S102, the control unit 20 reads re-stored chargeable area data from the chargeable area information memory 31 under the control of the chargeable area information acquisition unit 221.

FIG. 7 shows an example of chargeable area data including position information on an area as a chargeable object stored in the chargeable area information memory 31. In this embodiment, the chargeable area data takes the form of a data table including, in addition to a chargeable road ID and the latitude and longitude information of both a start point and an end point of each road, a lane ID for identifying each lane and the latitude and longitude information on both the start point and the end point of each lane, as position information in which each road ID is further subdivided at the lane level. Herein, only lanes as a chargeable object are stored in the data table. In FIG. 7, position information is simply shown as (latitude, longitude) for the sake of convenience; however, in actual data, the position information is acquired as specific numerical values of latitude and longitude.

Next, in step S103, the control unit 20 determines whether or not a traveling position of the mobile body (vehicle) 4 is within an area as a chargeable object, under the control of the chargeable area determination unit 222. As shown in FIG. 7, since the chargeable area data has latitude and longitude information at the lane level for the chargeable area, matching processing can be performed based on the acquired GPS measurement data of the mobile body 4 to determine whether or not there is a corresponding lane. Herein, if a measurement error in the GPS information affects the lane-level matching accuracy, the road-level matching processing may be performed based on the GPS information to specify a road ID, and a lane ID may be specified from the road ID by using camera image data. As a method of specifying a lane TL currently used for traveling from a camera image, such a lane TL may be specified by detecting a white line WL that demarcates the lane TL and utilizing the a relative position between the white line WL and the vehicle itself. For example, according to an image coordinate system in the camera image, which lane from the left the vehicle is traveling in can be determined from a positional relationship between the coordinates of the white line WL and the coordinates of the vehicle itself (for example, the center coordinates of the image). Furthermore, if the white line WL cannot be detected from the camera image, for example, if the number of lanes of a road on which the vehicle is traveling is known, which lane from the left the vehicle is traveling in can also be determined from the positional relationship between a region of the road and the coordinates of the vehicle itself (for example, the center coordinates of the image) according to the image coordinate system in a vehicle-mounted camera video. The determination of the lane TL in which the vehicle is traveling is not limited to these methods, and may adopt a discretionary method.

If it is determined in step S103 that a traveling position of the mobile body (vehicle) 4 is outside the chargeable area, the processing is terminated. On the other hand, if it is determined in step S103 that the traveling position of the mobile body (vehicle) 4 is within the chargeable area, the processing proceeds to step S104.

In step S104, the control unit 20 specifies the identification information (lane ID) of the lane TL in which the mobile body 4 is traveling under the control of the lane specification unit 223, and under the control of the movement information acquisition unit 22, adds, for example, an identifier for identifying the mobile body 4 and date and time information, to the specified lane ID, stores it as movement information data in the movement information memory 32, and also outputs it to the toll determination unit 23.

FIG. 8 shows an example of movement information data stored in the movement information memory 32. The movement information data includes a vehicle ID for identifying the mobile body 4, a date and time when the data is stored, and a lane ID for identifying a lane TL in which the mobile body 4 is traveling. The vehicle ID may be a fixed identifier or a temporarily assigned identifier. FIG. 8 shows an example in which the date and time information is stored in units of 1 second; however, this example is not a limitation and a discretionary time interval can be used.

(3) Determination and Output of Toll

Thereafter, the control unit 20 of the lane pricing device 1 performs processing of determining a toll to be charged to the mobile body 4 for its traveling in a chargeable area under the control of the toll determination unit 23.

In step S105, the control unit 20 reads pre-stored toll information data from the toll information memory 33 under the control of the toll determination unit 23.

FIG. 9 shows an example of toll information data including toll information on an area as a chargeable object, which is stored in the toll information memory 33. The toll information data takes the form of a data table in which a toll is defined for each lane ID. In the data table shown in FIG. 9, a toll is further finely set by the time zone. As a time granularity of toll setting, FIG. 7 shows an example in which a toll is set in units of 1 hour; however, a toll may be set with a discretionary granularity, for example, in units of 30 minutes or 3 hours.

In step S106, under the control of the toll determination unit 23, the control unit 20 searches the toll information data for a record that matches in terms of a lane ID and a time zone, based on the lane ID and the date and time information received from the movement information acquisition unit 22. For example, if the acquired time information is 10:20, in the example of FIG. 9, a record is searched for from the columns of the time zone from 10:00 to 11:00.

Next, in step S107, the control unit 20 determines a toll by extracting a value in the toll column of a matching record based on toll information data under the control of the toll determination unit 23. For example, if the lane ID is “A-1” and the time information is 10:20, in the example of FIG. 9, a toll is determined to be 10 yen.

In step S108, under the control of the output control unit 24, the control unit 20 outputs a toll determined by the toll determination unit 23 to an external device, a user, etc., through the input/output interface unit 10.

For example, the output control unit 24 may transmit a toll determined by the toll determination unit 23 to the charging server SV to request charging processing. This allows the charging server SV to charge the mobile body 4 or an owner thereof with a toll determined in units of lanes in response to the charging processing request.

Alternatively, the output control unit 24 may transmit a toll determined by the toll determination unit 23 to the vehicle-mounted device VD via the communication line CL in order to notify a driver of the mobile body 4 of the toll as an estimated toll amount. The vehicle-mounted device VD in receipt of the toll may notify the driver using synthesized voice, visual display, etc., about a toll that will be charged if he or she continues to drive in the lane currently being used for traveling. For example, the vehicle-mounted device VD may notify a driver by generating a voice signal such as “The vehicle has entered a pay lane. The toll of the current lane is 10 yen.” This allows a driver to know a toll in advance before actual charging, and to take measures such as making a lane change. In addition, the notification of a toll allows a driver to also know that he or she has entered a pay lane, to confirm whether or not a current route for traveling is correct, or to consider a route change.

Alternatively, the output control unit 24 may output a toll determined by the toll determination unit 23 to a control unit of the traffic control center in order to display the toll on an electric bulletin board on a road. This also allows a driver who sees the display to take measures such as making a lane change according to the toll.

(4) Dynamic Pricing Processing

The lane pricing device 1 according to an embodiment is configured to further perform dynamic pricing processing of dynamically updating the toll information according to a traffic volume separately from or simultaneously in parallel with the processing (1) to the processing (3) described above.

Figure 5:
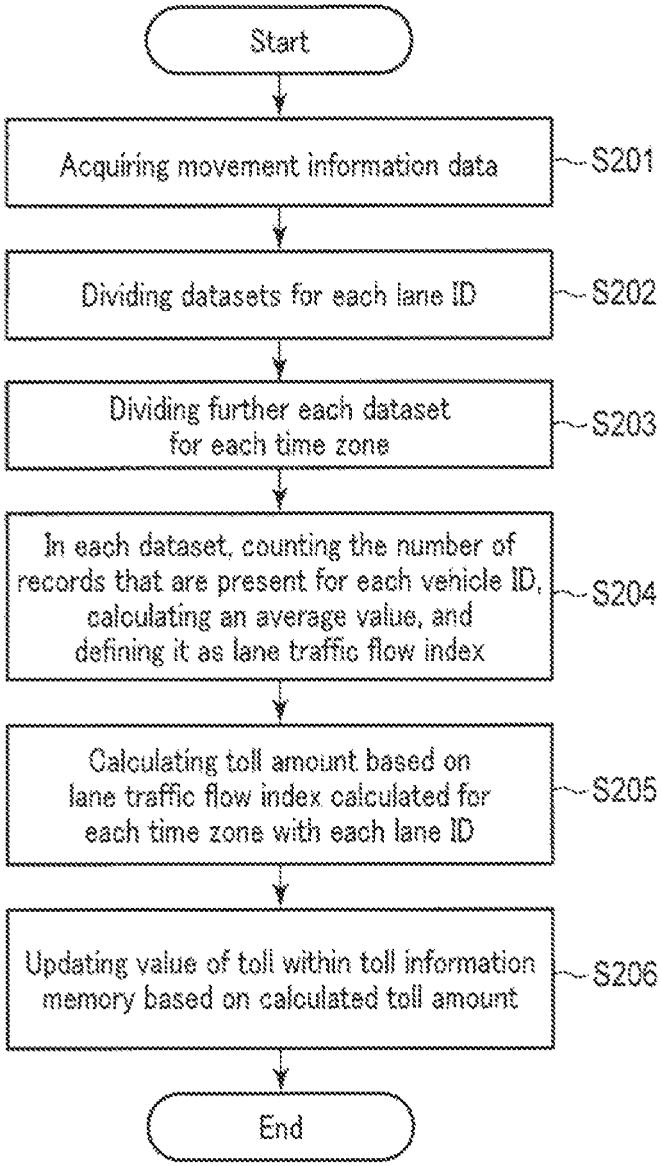
FIG. 5 is a flowchart showing a processing procedure and processing contents of dynamic pricing processing by the lane pricing device shown in FIG. 3.

FIG. 5 is a flowchart showing a processing procedure and processing contents of the dynamic pricing processing by the lane pricing device 1. This processing is mainly performed by the dynamic pricing unit 25.

First, in step S201, the control unit 20 of the lane pricing device 1 acquires the stored movement information data from the movement information memory 32 under the control of the movement information collection unit 251. As shown in FIG. 8, the movement information data includes a vehicle ID for identifying a vehicle, information on a date and time when the data is stored, and a lane ID for identifying a lane in which the vehicle is traveling.

In step S202, under the control of the traffic flow evaluation unit 252, the control unit 20 divides the acquired movement information data into datasets on a lane-ID basis.

Furthermore, in step S203, under the control of the traffic flow evaluation unit 252, the control unit 20 further divides each of the datasets divided on a lane-ID basis into datasets on the basis of a granularity of a time zone defined by the toll information memory 33. For example, in the example of the toll information data shown in FIG. 9, a time zone is defined with a granularity in units of 1 hour. Thus, in the dividing processing in step S203 also, datasets are divided into units of 1 hour.

FIG. 10A shows an image in which the position data is divided for each lane ID and then further divided for each time zone. The example of FIG. 10A shows datasets limited to data having “A-1” as a lane ID and “10:00 to 11:00” as a time zone. Datasets such as that described above are present for every lane ID and further for every time granularity.

In step S204, under the control of the traffic flow evaluation unit 252, the control unit 20 counts the number of records that are present for each vehicle ID in each dataset as shown in FIG. 10A, calculates the average value of records, and defines the average value as a lane traffic flow index.

FIG. 10B shows an example of the calculated and defined lane traffic flow index. V1 and V2 are present as vehicle IDs, and a result of counting each of them is shown as the number of records for each of them. The aforementioned number of records corresponds to a log of traveling in the corresponding lane. A larger number of records indicates a longer time that the mobile body 4 was traveling in the corresponding lane, and thus means that the traffic flow was slow. Conversely, a smaller number of records indicates a shorter time that the mobile body 4 was traveling in the corresponding lane, and thus means that the traffic flow was good. In the example of FIG. 10B, for lane A-1, the average number of records is calculated as 2.5, and this value is defined as a lane traffic index.

Next, in step S205, the control unit 20 evaluates the relativity of traffic flow indexes each calculated for each time zone with each lane ID under the control of the dynamic toll control unit 253, thereby calculating a toll amount for each lane. By this, a toll to be charged can be corrected in consideration of the relative evaluation result of traffic flow indexes. A discretionary method can be adopted to calculate a toll amount. For example, it is possible to adopt the configuration that if a calculated traffic flow index exceeds a predetermined threshold value, a toll for a corresponding lane is increased.

In step S206, under the control of the dynamic toll control unit 253, the control unit 20 performs processing of updating a toll value of the toll information data stored in the toll information memory 33 based on a toll amount newly calculated in consideration of the relative evaluation result of the traffic flow indexes.

The traffic flow may be calculated not only at the lane level but also with a finer granularity for each time zone, for example. The updating of the toll information data in the dynamic pricing unit 25 by the toll information memory 33 may be performed periodically, for example, in units of 1 hour, or may be activated by a road manager or the like at his or her will. The movement information data stored in the movement information memory 32 may include travel data from a plurality of vehicles, and data collected from a car manufacturer or a car navigation manufacturer or data provided from a road manager may be partially or entirely used as position data.

Advantageous Effects

As described above in detail, according to the embodiment, the lane pricing system or the lane pricing device 1 that charges a toll to the mobile body 4 passing through a road for use of a lane uses at least one of the camera image data and/or the GPS position information from the camera 2 and/or the GPS sensor 3 mounted on the mobile body 4, thereby being able to determine at the lane level, whether or not the road on which the mobile body 4 is traveling is a chargeable area, and reading a preset toll at the lane level.

By this, a travel position of the mobile body 4 can be specified at the lane level and the mobile body 4 can be charged at the lane level by utilizing information from a general camera 2 and GPS sensor 3 mounted on the mobile body 4 without the need to provide an expensive sensor on the infrastructure side. By using camera image data in combination with GPS measurement data, even in a situation in which the GPS measurement data cannot be stably acquired, a lane can be continuously specified with a certain accuracy. Furthermore, the influence of an error included in the GPS measurement data can be minimized by using the camera image data in combination therewith, and a highly reliable result of specifying a lane can be obtained.

Furthermore, in the lane pricing system or the lane pricing device 1 according to the embodiment, when it is determined that the mobile body 4 is traveling within a chargeable area, a traffic flow at the lane level within the chargeable area can be calculated by accumulating the position information at the lane level. Then, the traffic flow can be adjusted at the lane level by dynamically adjusting a charging toll at the lane level according to the calculated traffic flow, and traffic control according to various purposes can be realized.

For example, the effect of traffic congestion mitigation can be produced by the dynamic pricing unit 25 appropriately performing the charging design at the lane level in accordance with the traffic flow at the lane level. For example, when an emergency vehicle passes, by the dynamic pricing unit 25 appropriately performing the charging design at the lane level, the traffic behavior of general vehicles can be controlled as much as possible, which produces the effect of smoothing the movement of the emergency vehicle.

Furthermore, for example, with respect to a road that is difficult to travel due to a step on the road caused by construction or deterioration of the road surface condition, an additional value can be added to a driving behavior in a lane that allows comfortable travel, by the dynamic pricing unit 25 appropriately performing the charging design at the lane level based on the grasping of the surface condition of the aforementioned road at the lane level.

Other Embodiments

The present invention is not limited to the above embodiment.

For example, the above embodiment was described based on the presumption that the lane pricing system includes the vehicle-mounted device VD. However, the vehicle-mounted device VD is not an essential component, and the camera 2 and the GPS sensor 3 may be configured in such a manner as to directly transmit observation data to the lane pricing device 1. Similarly, the camera 2 and the GPS sensor 3 are not necessarily separate devices, and may be integrated into the vehicle-mounted device VD.

Similarly, the above embodiment was described based on the presumption that the lane pricing system includes the charging server SV. However, the charging server SV is also not an essential component, and the lane pricing system may be configured in such a manner as to output a value of a toll determined by the lane pricing device 1 to another toll collection system.

The above embodiment was described based on the presumption that the lane pricing device 1 is implemented as a server device. However, the lane pricing device is not limited to the above, and may be, as described above, implemented as a part of the vehicle-mounted device VD mounted in each mobile body 4 such as an automobile. In this case, the lane pricing device 1 is configured to: receive camera image data and GPS measurement data directly from the camera 2 and the sensor 3; determine whether or not the mobile body 4 has entered a lane as a chargeable object, for example, at certain time intervals; and when it is determined that the mobile body 4 has entered the lane as a chargeable object, determine and output a toll to be charged to the mobile body 4. For example, the determined lane pricing device 1 may notify a driver of the mobile body 4 of the toll as an estimated toll amount, or may transmit the toll to the charging server SV via the communication line CL to request charging processing based on the determined toll.

Furthermore, the units 21 to 25 included in the lane pricing device 1 may be distributed and arranged in a vehicle-mounted system, a cloud computer, an edge router, etc., and a toll may be determined by these devices cooperating with each other.

The above description was made based on the presumption that when it is determined that the mobile body 4 is within the area as a chargeable object, the movement information acquisition unit 22 stores information for identifying a lane in which the mobile body 4 is traveling in the movement information memory 32; however, it can also be considered that this information is further transmitted to the outside and utilized. For example, the stored movement information data may be transmitted to a server of a traffic control center or a road management center at certain time intervals, and may be used as data for monitoring a traffic volume or for predicting traffic congestion in units of lanes. For example, when a traffic flow in a specific lane is significantly decreased, the cause may be analyzed based on a camera image. When a decrease in traffic flow is detected in a specific lane in a specific area, retrieval, extraction, and analysis of image data based on position information and time information may lead to early detection of a fallen object on a road, an abnormality in a road surface state, or the like. Furthermore, in such a case, it can also be considered that a smooth traffic flow is promoted by lowering a toll for a detour route.

The above description was made based on the presumption that the toll amount is set in accordance with a time zone for each lane; however, various setting conditions may be set. For example, a toll may be set in more detail, in accordance with, for example, a day of the week, a vehicle type, a displacement, etc.

Furthermore, a road as a chargeable object is not limited to an expressway or a toll road, and may include any road that is chargeable, such as a cycling road, a sidewalk, a farm road, etc. In addition, observation data to be acquired, a data format of pre-stored data, and the like can be variously modified without departing from the gist of the present invention.

In short, the present invention is not limited to the above embodiments as they are, and can be embodied by modifying structural elements in the implementation stage without departing from the gist of the invention. In addition, various inventions may be constituted by appropriately combining a plurality of components disclosed in the first embodiment. For example, some components may be omitted from all the components shown in the embodiments. Furthermore, structural elements over different embodiments may be appropriately combined.

REFERENCE SIGNS LIST

1 . . . lane pricing device
2 . . . camera
3 . . . GPS sensor
4 . . . mobile body
10 . . . input/output interface unit
20 . . . control unit
20A . . . processor
20B . . . program memory
21 . . . observation data acquisition unit
22 . . . movement information acquisition unit
221 . . . chargeable area information acquisition unit
222 . . . chargeable area determination unit
223 . . . lane specification unit
23 . . . toll determination unit
24 . . . output control unit
25 . . . dynamic pricing processing
251 . . . movement information collection unit
252 . . . traffic flow evaluation unit
253 . . . dynamic toll control unit
30 . . . data memory
31 . . . chargeable area information memory
32 . . . movement information memory
33 . . . toll information memory

The invention claimed is:

1. A lane pricing system configured to determine a toll to be charged to a vehicle for use of a lane constituting a road, the lane pricing system comprising:

a vehicle including:

an observation data acquisition unit, comprising one or more processors of the vehicle, configured to acquire both position information of the vehicle measured based on a global positioning system (GPS) signal transmitted from a transmission source and a camera image that is acquired by capturing an image from a camera of the vehicle and includes a part of a lane in which the vehicle is moving; and a lane pricing device comprising:

a movement information acquisition unit, comprising one or more processors of the lane pricing device, configured to specify, based on the position information, a road in which the vehicle is moving, specify, based on the camera image, a lane of the road in which the vehicle is moving, and acquire lane identification information for identifying a specified lane along with time information indicative of a time when the vehicle moves in the lane, wherein the specifying of the lane comprises determining which lane from a left or right the vehicle is traveling in from a positional relationship between a predefined object and longitude and latitude coordinates of the vehicle itself according to an image coordinate system in the camera image, wherein the movement information acquisition unit is configured to specify the lane of the road in which the vehicle is moving based on the camera image by: determining longitude and latitude coordinates of a portion of the road in the image and the longitude and latitude coordinates of the vehicle; and specifying the lane of the road in which the vehicle is moving based on the longitude and latitude coordinates of the portion of the road and the longitude and latitude coordinates of the vehicle, wherein the movement information acquisition unit is configured to determine a reliability of the position information obtained from the acquired GPS signal and, in response to determining that the acquired GPS signal is unreliable, performing a matching process of matching the position information from the GPS signal with the longitude and latitude coordinates of the image;

a toll determination unit, comprising the one or more processors of the lane pricing device, configured to determine a toll to be charged to the vehicle based on the lane identification information and the time information;

a movement information collection unit, comprising the one or more processors of the lane pricing device, configured to collect the lane identification information and the time information acquired from a plurality of mobile bodies along with identification information of each of the mobile bodies;

a traffic flow evaluation unit, comprising the one or more processors of the lane pricing device, configured to count a number of records that are present in the lane identification information for the identification information of each of the mobile bodies and calculate a lane traffic flow index which is an average value of the counted number of records;

a dynamic toll control unit, comprising the one or more processors of the lane pricing device, configured to dynamically control a toll to be charged to each of the mobile bodies, which is determined by the toll determination unit, in accordance with the lane traffic flow index and a time zone corresponding to a time indicated by the time information; and an output unit, comprising the one or more processors of the lane pricing device, configured to output the determined toll to the outside to request a charging processing.

2. The lane pricing system according to claim 1, further comprising:

the movement information collection unit configured to collect the lane identification information and the time information acquired from a plurality of vehicles along with identification information of each of the vehicles;

the traffic flow evaluation unit configured to evaluate a traffic flow based on identification information, lane identification information, and time information that are acquired from each of the vehicles; and the dynamic toll control unit configured to dynamically control a toll to be charged to each of the vehicles determined by the toll determination unit in accordance with an evaluation result of the traffic flow.

3. The lane pricing system according to claim 2, wherein the traffic flow evaluation unit relatively evaluates a traffic flow for each lane, and the dynamic toll control unit dynamically controls a toll to be charged to each of the vehicles in accordance with a relative evaluation result of a traffic flow.

4. The lane pricing system according to claim 1, wherein the movement information acquisition unit comprises:

a chargeable area information acquisition unit configured to acquire latitude and longitude information of a geographical area including a lane as a chargeable object;

a chargeable area determination unit configured to determine whether or not the vehicle is moving within the geographical area based on the position information of the vehicle and the camera image, and latitude and longitude information of the geographical area; and a lane specification unit configured to, if the chargeable area determination unit determines that the vehicle is moving within the geographical area, specify a lane in which the vehicle is moving.

5. A lane pricing method that is performed by a lane pricing device configured to determine a toll to be charged to a vehicle for use of a lane constituting a road, the lane pricing method comprising:

by a vehicle, acquiring both position information of the vehicle measured based on a global positioning system (GPS) signal transmitted from a transmission source and a camera image that is acquired by capturing an image from a camera of the vehicle and includes a part of a lane in which the vehicle is moving;

by one or more processors, determining a reliability of the position information obtained from the acquired GPS signal;

by the one or more processors, in response to determining that the acquired GPS signal is unreliable, performing a matching process of matching the position information from the GPS signal with longitude and latitude coordinates of the camera image;

wherein the matching process comprises:

by the one or more processors, specifying, based on the position information, a road in which the vehicle is moving, specify, based on the camera image, a lane of the road in which the vehicle is moving, and acquiring lane identification information for identifying a specified lane along with time information indicative of time when the vehicle is moving in the lane, wherein the specifying of the lane comprises determining which lane from a left or right the vehicle is traveling in from a positional relationship between a predefined object and longitude and latitude coordinates of the vehicle itself according to an image coordinate system in the camera image, wherein the specifying includes specifying the lane of the road in which the vehicle is moving based on the camera image by: determining longitude and latitude coordinates of a portion of the road in the image and the longitude and latitude coordinates of the vehicle; and specifying the lane of the road in which the vehicle is moving based on the longitude and latitude coordinates of the portion of the road and the longitude and latitude coordinates of the vehicle;

by the one or more processors, determining a toll to be charged to the vehicle based on the lane identification information and the time information;

by the one or more processors, collecting the lane identification information and the time information acquired from a plurality of mobile bodies along with identification information of each of the mobile bodies;

by the one or more processors, counting a number of records that are present in the lane identification information for the identification information of each of the mobile bodies and calculating a lane traffic flow index which is an average value of the counted number of records;

by the one or more processors dynamically controlling a toll to be charged to each of the mobile bodies, which is determined by the one or more processors, in accordance with the lane traffic flow index and a time zone corresponding to a time indicated by the time information; and by the one or more processors, outputting the determined toll to the outside to request a charging processing.

6. One or more non-transitory computer readable mediums storing one or more computer programs executed by one or more computers to provide the steps of:

acquiring both position information of a vehicle measured based on a global positioning system (GPS) signal transmitted from a transmission source and a camera image that is acquired by capturing an image from a camera of the vehicle and includes a part of a lane constituting a road in which the vehicle is moving;

determining a reliability of the position information obtained from the acquired GPS signal;

in response to determining that the acquired GPS signal is unreliable, performing a matching process of matching the position information from the GPS signal with longitude and latitude coordinates of the camera image;

wherein the matching process comprises:

specifying, based on the position information, a road in which the vehicle is moving, specify, based on the camera image, a lane of the road in which the vehicle is moving and acquiring lane identification information for identifying a specified lane along with time information indicative of time when the vehicle is moving in the lane, wherein the specifying of the lane comprises determining which lane from a left or right the vehicle is traveling in from a positional relationship between a predefined object and longitude and latitude coordinates of the vehicle itself according to an image coordinate system in the camera image, and wherein specifying includes specifying the lane of the road in which the vehicle is moving based on the camera image by: determining longitude and latitude coordinates of a portion of the road in the image and the longitude and latitude coordinates of the vehicle; and specifying the lane of the road in which the vehicle is moving based on the longitude and latitude coordinates of the portion of the road and the longitude and latitude coordinates of the vehicle;

determining a toll to be charged to the vehicle based on the lane identification information and the time information;

collecting the lane identification information and the time information acquired from a plurality of mobile bodies along with identification information of each of the mobile bodies;

counting a number of records that are present in the lane identification information for the identification information of each of the mobile bodies and calculating a lane traffic flow index which is an average value of the counted number of records;

dynamically controlling a toll to be charged to each of the mobile bodies in accordance with the lane traffic flow index and a time zone corresponding to a time indicated by the time information; and outputting the determined toll to the outside to request a charging processing.

* * * * *